Patented May 17, 1949

2,470,504

UNITED STATES PATENT OFFICE 2,470,504

CONDENSING FATTY ACID HALIDES WITH AROMATIC ACID HALIDES

Eugene Lieber, New York, N. Y., and Aloysius F. Cashman, Bayonne, N. J., assignors to Standard Oil Development Company, a corporation of Delaware No Drawing. Application August 22, 1945, Serial No. 612,121

4 Claims. (Cl. 260—590)

1

This invention relates to the preparation of novel chemical products and to uses thereof. More particularly it relates to the preparation of novel pour depressors for waxy mineral lubricating oils.

Heretofore, various attempts have been made to prepare pour depressors for waxy mineral lubricating oils from the starting materials of the general class of organic acid halides, as for instance by polymerization or auto-condensation of stearyl chloride, or condensation thereof with aromatic hydrocarbons such as naphthalenes. These and other attempts of the past have met with partial success, but although these prior products have in some cases had good pour depressing potency as determined by the standard A. S. T. M. pour point test, they have not generally had as good pour stability as was desired. The pour stability, as measured by the "test V" procedure is described in the Oil and Gas Journal, June 24, 1943. It has been found, for instance, that although a blend of a waxy mineral lubricating oil containing a small amount of a pour depressor may have an A. S. T. M. pour point as low as −30° F., that same blend may show a solid point as high as +10 or +20° F. when measured by the "test V" procedure for pour stability. The difference between the two tests is chiefly that in the A. S. T. M. pour point test the oil blend is heated once to insure complete solubility of all constituents, then gradually cooled down once and determining the lowest temperature (within 5°) at which the blend will still pour or flow, whereas, on the other hand, in the pour stability test the oil blend is subjected to a number of alternate heating and cooling cycles, the cooling always being down to the same low temperature of about −25° F. while the upper temperature to which the sample is permitted to warm in each cycle is progressively lower from 30° F. in the first cycle, down to 0° F. in the 6th cycle. Apparently, when a lubricating oil blend containing some pour depressor in it is stored in the wintertime where it is subjected to the fluctuations of atmospheric temperatures, there are certain combinations of temperature fluctuations which permit the oil to solidify, probably due to the fact that after a low cooling, a subsequent warming up to only a certain temperature will permit the wax crystals to dissolve but perhaps not the pour depressor, so that when the oil is subsequently chilled again the wax crystals are free to grow into long needle-like crystals because the pour depressor is not present in a liquid condition for adsorption of the wax crystals when they first formed.

2

Broadly, the present invention comprises copolymerizing or co-auto-condensation of two different types of organic halides, one being a fatty acid halide and the other an aromatic acid halide. The process involved here is termed the co-auto-condensation, because each of the separate constituents are per se capable of auto-condensation to build up high molecular weight linear type condensation products. The exact nature of the reactions involved in the present invention is not well understood, but it is believed that a number of different reactions take place simultaneously. It is likely that in addition to the primary reaction, the co-auto-condensation, i. e. a building up of high molecular weight chain-like condensation products consisting of alternate radicals derived from the fatty acids and aromatic acid halides, respectively, when hydrogen halide is split off therefrom, there is probably also formed some auto-condensation product of each separate constituent; there is the further possibility of some interlinking among all three types of condensation products. It is believed that the heterogeneous nature of this condensation product, i. e. the mere fact that it does consist of a mixture of different kinds of molecules, it as least partially responsible for the successful results obtained.

The fatty acid halide to be used according to this invention may be one having the general formula R—CO—X, where R is a hydrocarbon radical containing at least 6 aliphatic carbon atoms, but it may also contain aromatic, hydroaromatic, or cyclo aliphatic constituents, and X is a halogen, preferably chlorine. Examples of such monobasic fatty acid halides include stearyl chloride, oleyl chloride, palmityl chloride, phenyl-stearyl chloride, naphthyl-stearyl chloride, chlorides derived from coconut oil fatty acids, or other fatty acids such as those derived from linseed oil, etc. In fatty acid halides having the general formula R—COCl, it is preferred that R be an unsubstituted aliphatic hydrocarbon radical having more than 10 carbon atoms. Polybasic acid chloride may also be used, either alone or in conjunction with one or more of the monobasic acid chlorides, such as those mentioned above. The polybasic acid chlorides may have the general formula X—OC—$(CH_2)_n$—CO—X, where X is halogen as previously and where $n$ is an integer whose value is 1 or more, for example, adipyl chloride, sebacyl chloride, azalyl chloride, etc.

The aromatic acid halides to be used according to this invention may also consist of either mono- or polybasic acid halides, in this case, however, the acyl group being attached directly to an aromatic nucleus. The general formula covering this class of materials may be written Ar(COX)$_n$, in which Ar represents an aromatic nucleus which may or may not have one or more substituents such as alkyl groups, alkoxy groups, halogen atoms, e. g. chlorine, fluorine, etc., X represents halogen and $n$ is an integer of at least 1 and preferably not more than 2. Examples of suitable aromatic acid halides include benzoyl chlorides, phthalyl chloride, naphthalyl chloride, etc.

The proportions in which the fatty acid halides and the aromatic acid halides should be mixed before the co-auto-condensation, may be varied to some extent according to the particular nature of the individual material used, but generally should range from about ½ to 5, preferably 1–3, mols of the fatty acid halide to 1 mol of aromatic acid halide.

The reaction may be carried out merely by heating the reaction mixture, as, for instance, to a temperature of about 400–700° F., preferably about 500–600° F., for a sufficient reaction time ranging from about 3 to 24 hours, which generally varies inversely with the temperature used. On the other hand, it is possible, and may under some circumstances be preferable, to use a lower reaction temperature in the range of about 250 to 500° F. and to assist the reaction by the use of a catalyst, preferably of the Friedel-Crafts type, such as aluminum chloride, tin tetrachloride, zinc chloride, iron chloride, boron fluoride, etc. It is not necessary to use any inert solvent in carrying out the reaction, but one may be used if desired, such as a saturated petroleum hydrocarbon fraction, e. g. to refine heavy naphtha or kerosene, or a heavily chlorinated hydrocarbon such as tetrachlorethane, etc.

After the desired co-auto-condensation reaction has been completed, the desired high molecular weight condensation products may be recovered from the reaction mixture by various methods, but the preferred procedure is to exact a mixed condensation product with a solvent such as tetrachlorethane, and filtering to remove any insoluble materials. The solvent and any low boiling condensation products are unreacted raw materials which may be removed by distillation, preferably under reduced pressure, e. g. vacuum or fire and steam distillation, preferably up to a temperature of about 400° F. at an absolute pressure of 10 mm. or less, or to 500 or 600° F. at pressures not quite so low, e. g. 20 mm. to 50 mm. or so, to obtain the desired high molecular weight condensation product as distillation residue.

The resulting product, which is generally a dark oily or solid material, should have an average molecular weight of about 500 to 1200, preferably about 600 to 800. It is soluble in mineral oils and has wax modifying properties. It is particularly valuable as a pour depressor for mineral lubricating oil, for which purpose it is added to a suitable oil base stock in the concentration of about 0.1 to 5.0% preferably about 0.5 to 2.0%.

The object, advantages and details of the invention will be better understood from a consideration of the following experimental data.

*Example 1*

A mixture comprising 100 grams of stearyl chloride and 47 grams of benzoyl chloride were placed in a long necked flask and heated to a temperature of 600° F. and the temperature maintained thereat until the evolution of hydrogen chloride gas has substantially ceased. This required 2½ hours. The pyrolysis product was extracted with tetrachlorethane and filtered with paper. The solvent and low boiling materials were removed by distillation under 9 mm. of Hg pressure to 200° C. vapor temperature. 82 grams of a dark oil solid material was obtained as product.

When 1% of the condensation product prepared as described above was added to a Pennsylvania neutral oil having an original pour point of +30° F. the resulting pour point was found to be −15° F. At a concentration of 0.75% a pour point of −10° F. was obtained.

The pour stability properties were tested by blending in a test oil comprising a Pennsylvania neutral plus 2.5% of a Panhandle bright stock. The results were obtained by the so-called "test V" stable pour procedure. The following results were obtained:

|  | ASTM Pour Point, °F. | Solid Pt. in Test V | |
| --- | --- | --- | --- |
|  |  | Cycle 2 | Cycle 3 |
| Oil[1] +1% Pour depressor A | −15 | −5 | +5. |
| Oil[1] +1% Pour depressor B | −15 | −9 | −9. |
| Oil[1] +1% Product of Example 1 | −10 | −18 | Did not go solid.[2] |

[1] Penn. Neutral+2.5% Panhandle B. S.
[2] Down to −28 °F.

It will be noted from the data presented above that this new pour depressant has superior "pour stability" properties when compared to the two common commercial pour depressants "A" and "B." In cycle 3 of the above test, it will be noted that the product of this invention did not go solid even down to −28° F., whereas pour depressors "A" and "B" went solid at +5 and −9° F. respectively.

Pour depressor A is made by condensation of chlorinated paraffin wax with naphthalene in an inert solvent, with AlCl$_3$ catalyst; whereas pour depressor B is believed to be made by condensation of chlorinated wax with phenol.

*Example 2*

The procedure described in Example 1 was repeated exactly except that the following proportions of reagents were used:

|  | Grams |
| --- | --- |
| Stearyl chloride | 100 |
| Benzoyl chloride | 24 |

As before, 2½ hours were required to substantially remove the hydrogen chloride at 600° F. The product was recovered as before and a yield of 64 grams of a dark oily material was obtained as product.

When 1% of this product was added to a Pennsylvania oil neutral having an original pour point of 30° F., a pour point of −10° F. was obtained. At a concentration of 0.75% a pour point of −10° F. was obtained.

*Example 3*

The pour stability properties of the pour depressant prepared as described in Example 1 was tested at Minneapolis and Warren during the winter months. The test oil comprised a mixed base neutral lubricating oil +3.5% Pennsylvania bright stock. Two sets of blends were tested, namely, 0.5 and 1.0% of the product in the given test oils and the following overall pour stability ratings were obtained (observational range from about +30° to −13° F.), comparable data for pour depressors "A" and "B" also being given. The pour stability rating is the percent of the time the blends are observed to be fluid for the period of observation. Thus, a rating of 100 indicates that the particular blend was observed to be fluid at all observations, whereas a rating of 0 indicates that the blends is solid at all observations.

| | Pour stability rating |
|---|---|
| Pour depressor A | 61 |
| Pour depressor B | 74 |
| Present invention | 93 |

For the observational range of +1° to −10° F. which is the most critical temperature range, the following results were obtained:

| | Pour stability rating |
|---|---|
| Pour depressor A | 0 |
| Pour depressor B | 7 |
| Present invention | 61 |

A comparison of the individual blends at 1% concentration of additive will show the superiority of the product of the present invention over pour depressors "A" and "B."

| Additive | Minneapolis | | Warren | |
|---|---|---|---|---|
| | Times Solid | Highest Solid Point | Times Solid | Highest Solid Point |
| 1% Pour depressor A | 47 | +20 | 37 | +22 |
| 1% Pour depressor B | 33 | +20 | 16 | +22 |
| 1% Present Invention | 0 | Below −8 | 2 | −6 |

It should be noted that the pour stability rating of the product of the present invention shows surprisingly better pour stability behavior than the commercial pour depressors "A" and "B."

It is not intended that this invention be limited to the specific examples which have been given merely for the sake of illustration but only by the appended claims.

What is claimed is:

1. The process which comprises condensing ½ to 5 mols of a fatty acid halide having the general formula RCOCl in which R represents an aliphatic hydrocarbon group having more than 10 carbon atoms, with 1 mol of an aromatic acid halide having the general formula ArCOCl, in which Ar represents an aromatic hydrocarbon nucleus, using a reaction temperature of about 400° to 700° F., and recovering from the reaction mixture a product having an average molecular weight of at least 700.

2. Process which comprises condensing ½ to 5 mols of chloride with one mol of benzoyl chloride, using a reaction temperature of about 500° to 600° F.

3. Process according to claim 2 in which, after the reaction is completed, the reaction mixture was extracted with tetrachlorethane and filtered, and the extract solution is subjected to distillation under reduced pressure corresponding to a temperature of at least about 400° F. at an absolute pressure not higher than about 10 mm. mercury.

4. Process according to claim 2 using about 1 to 3 moles of stearyl chloride per mol of benzoyl chloride.

EUGENE LIEBER.
ALOYSIUS F. CASHMAN.

REFERENCES CITED

The following references are of record in the file of this patent:

UNITED STATES PATENTS

| Number | Name | Date |
|---|---|---|
| 1,939,979 | Henriksen | Dec. 19, 1933 |
| 1,939,994 | Lincoln | Dec. 19, 1933 |
| 2,033,545 | Ralston | Mar. 10, 1936 |
| 2,287,901 | Heidelberg | June 30, 1942 |
| 2,288,319 | Mikeska | June 30, 1942 |
| 2,315,063 | Lieber | Mar. 30, 1943 |
| 2,377,433 | Lieber | June 5, 1945 |

OTHER REFERENCES

Gilman et al., Jour. Am. Chem. Soc., vol. 61, pages 478–9 (1939).